United States Patent
Rebhan et al.

(10) Patent No.: US 9,566,981 B2
(45) Date of Patent: Feb. 14, 2017

(54) METHOD AND SYSTEM FOR POST-COLLISION MANOEUVRE PLANNING AND VEHICLE EQUIPPED WITH SUCH SYSTEM

(71) Applicant: HONDA RESEARCH INSTITUTE EUROPE GMBH, Offenbach/Main (DE)

(72) Inventors: Sven Rebhan, Offenbach (DE); Robert Kastner, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days.

(21) Appl. No.: 14/804,661

(22) Filed: Jul. 21, 2015

(65) Prior Publication Data
US 2016/0059855 A1    Mar. 3, 2016

(30) Foreign Application Priority Data
Sep. 1, 2014   (EP) .................................... 14183057

(51) Int. Cl.
*B60W 30/095*   (2012.01)
*B60R 21/00*    (2006.01)
*B60W 30/08*    (2012.01)

(52) U.S. Cl.
CPC ............ *B60W 30/095* (2013.01); *B60W 30/08* (2013.01); *B60W 30/0953* (2013.01);
(Continued)

(58) Field of Classification Search
CPC ............ B60W 30/095; B60W 30/0953; B60W 30/0956; B60W 2030/082; B60R 2021/0027; B60R 2021/01252; B60R 2021/01259
See application file for complete search history.

(56) References Cited

U.S. PATENT DOCUMENTS

| | | | |
|---|---|---|---|
| 6,195,625 B1* | 2/2001 | Day .................... | G06F 17/5018 703/1 |
| 6,856,906 B2* | 2/2005 | Winner .............. | B60K 31/0008 340/436 |

(Continued)

FOREIGN PATENT DOCUMENTS

| | | |
|---|---|---|
| DE | 10 2011 108 870 A1 | 4/2012 |
| DE | 10 2011 113 019 A1 | 5/2012 |

(Continued)

OTHER PUBLICATIONS

JPO machine translation of JP 2010-152656 (original JP document published Jul. 8, 2010).*

(Continued)

*Primary Examiner* — Behrang Badii
*Assistant Examiner* — David Testardi
(74) *Attorney, Agent, or Firm* — Squire Patton Boggs (US) LLP (57) ABSTRACT

A method predicts trajectories of traffic objects to avoid collisions. The method estimates the probability for at least two traffic objects to collide, and predicts a potential movement of the traffic objects presumably involved in the collision after the collision. This information about a potential movement of the traffic objects can be used to plan a suitable trajectory path of an evasion maneuver for a host-vehicle employing the method. A system detects the collision situation and applies crash situation models to predict the future dynamic properties of other traffic objects that collide or are about to collide with each other. The method and system applies specific crash models like collision models, models derived from crash simulations and tests or models of human reactions in emergency situations.

18 Claims, 5 Drawing Sheets

(52) U.S. Cl.
CPC . *B60W 30/0956* (2013.01); *B60R 2021/0027* (2013.01); *B60W 2030/082* (2013.01); *B60W 2550/30* (2013.01); *B60W 2710/20* (2013.01)

(56) References Cited

U.S. PATENT DOCUMENTS

| | | | | |
|---|---|---|---|---|
| 7,363,155 | B2* | 4/2008 | Meister | B60K 31/0008 340/436 |
| 8,112,225 | B2* | 2/2012 | Eidehall | G01S 7/295 340/436 |
| 8,260,538 | B2 | 9/2012 | Noda et al. | |
| 8,571,786 | B2* | 10/2013 | Iwasaki | B60W 10/06 340/435 |
| 8,930,060 | B1* | 1/2015 | Lu | G05D 1/0214 340/438 |
| 8,958,953 | B2* | 2/2015 | Stabrey | B60T 8/1755 340/435 |
| 2004/0254729 | A1* | 12/2004 | Browne | B60R 21/013 701/301 |
| 2005/0248570 | A1* | 11/2005 | Stelly | G06T 17/20 345/423 |
| 2006/0106538 | A1* | 5/2006 | Browne | B60R 21/01 701/301 |
| 2011/0054741 | A1 | 3/2011 | Stabrey | |
| 2013/0261869 | A1* | 10/2013 | Brenneis | B60W 50/0205 701/23 |
| 2014/0067206 | A1* | 3/2014 | Pflug | B60W 10/04 701/41 |
| 2014/0229069 | A1* | 8/2014 | Akiyama | B60T 7/12 701/41 |

FOREIGN PATENT DOCUMENTS

| | | | |
|---|---|---|---|
| DE | 10 2011 113 722 A1 | | 5/2012 |
| EP | 2 484 573 A1 | | 8/2012 |
| EP | 2 562 060 A1 | | 2/2013 |
| JP | 09136659 A | * | 5/1997 |
| JP | 10162283 A | * | 6/1998 |
| JP | 2006199134 A | * | 8/2006 |
| JP | 2010152656 A | * | 7/2010 |
| JP | 2012238080 A | * | 12/2012 |
| WO | WO 03/006288 A1 | | 1/2003 |
| WO | WO 02/08010 A1 | | 1/2010 |
| WO | WO 2010/000521 A1 | | 1/2010 |

OTHER PUBLICATIONS

JPO machine translation of JP 2012-238080 (original JP ducument published Dec. 6, 2012).*
Day, Terry D. et al., "Three-dimensional reconstruction and simulation of motor vehicle accidents", SAE Technical Paper 960890, Society of Automotive Engineers, 1996, 12 pages.*
Hongola, Bruce et al., Simulation and anamation tools for analysis of vehicle collisions: SMAC (Simulation Model of Automobile Collisions) and Carmma (Simulation Animations), California PATH Working Paper UCB-ITS-PWP-99-10, Jul. 1999, 9 pages.*
Zhou, Jing et al., "Collision model for vehicle motion after light impacts", Vehicle System Dynamics, vol. 46, Supplement, 2008, pp. 3-15.*
Zhou, Jing et al., "Collision model for vehicle motion prediction after light impacts", Vehicle System Dynamics, vol. 46, Supplement, 2008, pp. 3-15.*
European Search Report dated Feb. 11, 2015 corresponding to European Patent Application No. 14183057.0.
Richard Bellman, "The Theory of Dynamic Programming," the RAND Corporation, Nov. 1954, pp. 503-515.
Steven M. LaValle, "Rapidly-Exploring Random Trees: A New Tool for Path Planning," Department of Computer Science, Iowa State University, pp. 1-4, (1998).

* cited by examiner

METHOD AND SYSTEM FOR POST-COLLISION MANOEUVRE PLANNING AND VEHICLE EQUIPPED WITH SUCH SYSTEM

BACKGROUND

Field

The present invention relates to the field of automated, computerized driver assistance systems for air, land or sea vehicles, where for example a sensor of a host vehicle physically senses the environment of the host vehicle to acquire data describing a traffic environment, and a computing unit which computes, based on acquired data, information which assists the driver in the guidance of the host vehicle. The invention is in particular in the area of predictive emergency automated driver assistance systems (ADAS) that predict future trajectories of other traffic participants in order to enable the host vehicle driver to evade collisions with the other traffic participants or enable the ADAS system of the host vehicle to evade the collisions autonomously.

Description of the Related Art

Driver assistance systems such as "Adaptive Cruise Control" increase driver comfort and safety. They are currently especially used for carrying out longitudinal control of a host vehicle, for example with respect to a velocity specified by the driver and ranging to other traffic objects such as other land, air or sea vehicles (cars, motorbikes, bikes, trucks, etc.), pedestrians, . . . . The host vehicle is provided with ("hosts") a sensor physically sensing the host vehicle's environment and a computing unit processing an output signal of the at least one sensor. Lateral control of the host vehicle in combination with the longitudinal control is of particular importance for avoiding collisions with other traffic participants. Avoiding collisions is one of the central aims of future ADAS. When emergency situations such as a close-to-crash situation or an exceptional situation such as a crash directly in front of the own vehicle arise, drivers appreciate the assistance of ADAS components such as a collision-mitigation-and-brake system (CMBS). A CMBS system that controls autonomously decelerating the host vehicle to a stand-still or evading other traffic objects by steering commands to avoid or mitigate collisions of the host vehicle with other traffic objects.

When a close-to-crash situation arises, the earlier reactions of the host vehicle to the traffic situation are initiated, the higher is the probability of effectively avoiding a collision. If the host vehicle starts applying a brake or executing an evasion manoeuvre earlier, required actions are less extreme and the probability for avoiding the collision is altogether increased. In order to be able to react earlier, a reliable prediction of the movement of other traffic objects is of high importance. This especially applies in the case of two other traffic objects colliding and suddenly and abruptly changing both their velocity and their direction after the collision occurred.

Under this circumstance a host vehicle is a vehicle in a traffic situation which has the driver assistance system according to the invention mounted thereon and which is equipped with data acquiring means and a computing system that allows the computation of a likely future behavior of other traffic vehicles. The host vehicle is sometimes also referenced as ego-vehicle.

A sensor may be any means that can deliver information suitable for describing at least some aspects of a traffic scene at a point in time. Such sensors may be cameras, radar, lidar that are different types and may form part of or the entire data acquisition means which may comprise even communications means as discussed later with respect to an embodiment.

A target object that may be a target vehicle is an object being observed by generating information by at least one sensor and for which a future behavior shall be estimated. Other objects may be pedestrians, bicyclists or the like.

In prior art there are mentioned systems which evaluate the current state of other traffic participants in a traffic scene to detect critical situations and to trigger an appropriate action in response to the detected critical situation. Appropriate actions are for example warnings or emergency braking in order to avoid or to mitigate a crash with another traffic object.

A further category of assistance systems is configured to apply traffic situation models to acquire data describing a traffic environment (sensor data) in order to generate prediction information describing the future movement of the other traffic objects in usual traffic situations. Based on this prediction information on future movements those systems plan or initiate further actions like warning or calculating an evasion trajectory for the host vehicle.

All systems described in the related work base their recommended actions such as warnings, braking or evasion manoeuvres solely on information available at the host vehicle and conventional knowledge on vehicle agility. Only those manoeuvres of the other traffic objects are taken into consideration which appear suitable to avoid a crash.

U.S. Pat. No. 8,260,538 B2 describes a system detecting an obstacle, determining the current distance and relative velocity to the obstacle and based on a time-to-contact (TTC) until colliding with the obstacle, initiating multiple staged actions comprising warning and different levels of braking. A future movement of the obstacle is not taken into consideration.

WO 2010/000521 describes a system that detects traffic relevant objects in the vicinity of the host vehicle and predicts the future trajectory of the host vehicle as well as of at least one other traffic object. Using the perceived environment it determines the criticality of the traffic object in order to predict an evasion trajectory for the host vehicle. Based on this predicted evasion trajectory the system can initiate at least one of the following actions: showing a permanent path recommendation to the driver, warning the driver, applying a vehicle brake and steering.

None of the cited documents makes a prediction for a movement of the colliding traffic objects after a crash and therefore the state of the art lacks any perception of the dynamics of the crash for movement prediction of traffic objects involved in such collision.

The discussed state of the art requires improved collision avoidance capabilities when compared to the known methods available today.

SUMMARY

The invention hence solves the above problem by a new and unobvious method and a corresponding system, vehicle and program.

The inventive method assists a driver of a host vehicle, wherein the host vehicle comprises at least one data acquisition means and a processing means and the method comprises at first a step of acquiring data describing an traffic environment by the data acquisition means. The method is characterized by processing the acquired data describing the traffic environment in order to generate a crash determination information from the data describing the traffic environment, determining based on the crash determination information whether a crash situation involving at least one target object will occur which means the probability for such crash lies above a certain value and when the crash situation is determined to exist, predicting a movement behavior of the at least one target object after such crash based on the data describing the traffic environment by applying at least one crash situation model.

The method therefore addresses the technical problem by a step of estimating the probability for two other traffic participants to collide and in a succeeding step of predicting potential movement of the at least one target object or all the traffic participants about to collide after their collision.

The data describing the traffic environment can be any data which is suitable to relate to the traffic scene in a vicinity of the host vehicle which is of relevance to the future movement possibilities of the host vehicle, in particular data (sensor data) acquired by at least one sensors mounted on board of the host vehicle.

The crash determination information can comprise a determination value describing a probability of a crash in the perceived traffic scene, data on the identity and characteristics of traffic objects involved in the possible crash, data describing the traffic scene forming the basis for the possible crash (collision) scene, etc.

In a preferred embodiment of the inventive method a step of predicting further movement behavior of at least one further target object based on the data describing the traffic environment by applying at least one traffic situation model, when the crash situation is determined. This at least one further target object is not involved in the crash situation and the method further comprises a step of generating the prediction information based on the predicted further movement behavior and the traffic situation model.

The determination based on the crash determination information whether a crash situation involving the at least one target object will occur, may include determining, based on a deceleration required by a target object in order to avoid colliding with another traffic object (participant), if a crash situation is about to arise.

In an embodiment of the claimed invention the prediction information is used to plan an evasion trajectory (path) of an evasion maneuver for the host vehicle. The present invention achieves predicting trajectories of other vehicles which are about or already involved in a crash such that an evasion maneuver planning module can compute an evasion trajectory for the host vehicle that avoids or at least mitigates collision with other traffic objects.

According to an embodiment of the invention the method is characterized by calculating at least one future movement trajectory of the host vehicle based on the prediction information.

The method according to an advantageous embodiment includes calculating the future movement behavior of the at least one target object using at least one crash situation model, wherein the at least one crash situation model comprises at least one physical collision model. The physical collision model can include at least one of an elastic collision model, an inelastic collision model or can include a combination of an elastic and an inelastic collision model.

An embodiment of the invention uses at least one crash situation model which is generated by analyzing crash test data. It is particularly preferred that the mass of objects involved in a crash is estimated. Such estimation can be performed for example by determining a vehicle-type-determination and use a predetermined mass value for the respective vehicle-type. Vehicle-types may be for example limousine, station wagon, sportscar, van, truck, working machine, motorcycle and so on. The determination of the type may be performed by image processing to identify a type of vehicle which shows most similarity to an observed vehicle. One possible alternative is of course that the exact model is determined. Both could be performed by car-to-X-communication also. The knowledge about the vehicle-type or model is then used to determine the corresponding vehicle (object) mass. The mass might be obtained from a correspondence table stored in the system. The crash situation model can also base on data generated by simulation of one or a plurality of collisions (crash) involving at least one traffic object (traffic participant).

The method according to an embodiment is characterized in that the at least one traffic situation model comprises at least one traffic situation model of an overtaking situation model, a follow situation model and an evasion situation model.

In an embodiment of the method according the at least one future movement trajectory of the host vehicle is calculated using rapidly-exploring random tree processing or a derivative processing thereof. In a further embodiment of the method the at least one future movement trajectory of the host vehicle is calculated based on dynamic programming or a derivation method thereof. The at least one future movement trajectory predicted can be a planned evasion trajectory evading any collision of the host vehicle with other traffic objects or obstacles.

The one data acquisition means equipping of the host vehicle according to a preferred embodiment is configured to acquire data relating to the traffic environment of the host vehicle suitable to determine a state of the at least one target object. The acquired data relating to the traffic environment of the host vehicle may be sensor data generated by at least one sensor means. Such sensor means can include at least one of a radar, a lidar, an optical sensing means such as a camera or any combination of the cited sensor means. The data acquisition means of an embodiment may also comprise units for vehicle-to-vehicle communication, units for vehicle-to-infrastructure-communication or any other communication means allowing determining the state of the other traffic participants.

The at least one sensor means of the host vehicle according to a preferred embodiment of the vehicle can be adapted to determine a state of a road. The at least one sensor means can also include an environmental sensor, e.g. a temperature sensor, a rain sensor or a receiver for weather information.

The method according to an embodiment of the invention comprises a step of generating an actuation signal conveying actuation information generated based on the prediction information, and a step of controlling an actuator based on the actuation signal. An actuator may be a means for presenting information to the driver of the vehicle, e.g. an acoustical or optical warning signal, or a haptic warning, or the actuator may be any means for controlling or influencing the control of the vehicle. An example for controlling the vehicle may be a vehicle brake or a steering unit of the vehicle. Further, an actuator may be any means that causes or influences actuation and/or performance of passive safety equipment like absorption elements or inflators of airbag systems.

In a further embodiment the step of controlling an actuator may include controlling the vehicle in a lateral direction and/or recommending an evasion trajectory to a driver of the vehicle. An embodiment may control the vehicle in a lateral direction, e.g. by controlling an electrical power steering and/or by accelerating or decelerating at least one wheel of the vehicle. Alternatively or in addition passive safety equipment may be prepared or actuated when it can be recognized that a collision of the host vehicle cannot be avoided and thus the host vehicle is involved in the crash. In a simple embodiment absorption elements may be prepared in advance for example damper elements are brought in position or vehicle doors may be filled with absorption foam. Of course, when the course of the crash can be determined more precisely, this can be made in particular as needed. For example, airbag systems can be inflated in a timely manner corresponding to a multiple inpact scenario. There, for example, first the front airbag are activated and then later as needed in a following collision on a side the corresponding side airbag is activated.

The technical problem is solved by a system for assisting a driver of a host vehicle, wherein the system comprises at least one data acquisition means configured to acquire data describing a traffic environment of the host vehicle and a processing means. The processing means is configured to process the data describing the traffic environment of the host vehicle in order to generate a crash determination information, and the processing means further comprises a crash detection module configured to determine based on the crash determination information whether a crash situation involving at least one target object will occur, and a crash trajectory prediction module configured to predict movement behavior of the at least one target object after the crash based on the sensor data by applying at least one crash situation model.

In a system for assisting a driver of a vehicle according to a preferred embodiment the processing means further comprises a non-crash trajectory prediction module configured to, when the crash situation is determined, predicting further movement behavior of at least one further target object based on the data describing the traffic environment of the host vehicle by applying at least one traffic situation model, wherein the at least one further target object is not involved in the crash situation. The processing means is configured to generate the prediction information based on the predicted further movement behavior determined based on the traffic situation model and the movement behavior determined based on the crash situation model.

In a further embodiment the system for assisting a driver of a vehicle is characterized by the processing means further comprising a host vehicle evasion trajectory planning module configured to calculate based on the prediction information at least one future movement trajectory of the host vehicle.

The system for assisting a driver of a vehicle according to an embodiment includes the crash trajectory prediction module configured to process sensor data based on at least one crash situation model applying at least one physical collision model.

In a further advantageous embodiment the system for assisting a driver of a host vehicle comprises the crash trajectory prediction module configured to process data describing the traffic environment of the host vehicle based on at least one crash situation model including analyzed crash test data and/or crash simulation data. The system further comprises a mass estimation unit or then processing means is configured to estimate the mass of vehicle(s) involved in a crash. This estimation or determination is performed as described above with respect to the method of the invention.

In the system for assisting a driver of the host vehicle, the non-crash trajectory prediction module is configured to predict further movement behavior by applying at least one situation model comprising at least one of an overtaking situation model, a follow situation model and an evasion situation model.

In an advantageous embodiment the system for assisting a driver of a host vehicle includes the host vehicle evasion trajectory planning module being configured to calculate the at least one future movement trajectory of the host vehicle using rapidly-exploring random tree processing or a derivative processing thereof, or dynamic programming or a derivation thereof.

In the system for assisting a driver of a vehicle according to an embodiment the at least one sensor is configured to determine a state of the at least one target object or to determine a state of a road.

In an advantageous embodiment the system for assisting a driver of a host vehicle further comprises an actuation processing module configured to generate an actuation signal based on the prediction information, and to control an actuator based on the actuation signal.

The system for assisting a driver of a host vehicle according to an embodiment the actuation signal controls an actuator to control the vehicle in a lateral direction and/or recommends an evasion trajectory to a driver of the vehicle.

The actuation processing module of an embodiment of the invention is configured to control the vehicle in a lateral direction by controlling an electrical power steering and/or by accelerating or decelerating at least one wheel of the vehicle and/or passive safety equipment in case the host vehicle is determined to be involved in the crash as described above with respect to the method according to the invention.

The technical problem is further advantageously solved by a vehicle including a driver assistance system to any of the embodiments cited above, wherein the driver assistance system is configured to influence control of the vehicle based on output signals of the driver assistance system.

The problem is advantageously solved by a computer program with program-code means for executing the steps of the method for assisting a driver of the vehicle when the program is executed on a computer or digital signal processor.

In this invention a system is claimed that detects the aforementioned situations and applies models to predict the future dynamic properties (like heading direction and velocity) of other traffic participants that collides or are about to collide with each other. To do so, the current invention proposes to apply crash models derived either from physics, e.g. collision models, models derived from crash simulations and tests or models of human behavior related to late reactions in emergency situations. The resulting predicted trajectories will then be used together with other information about the traffic environment, e.g. static obstacles etc., to plan an evasion trajectory for the host vehicle avoiding or mitigating collisions of the host-vehicle.

BRIEF DESCRIPTION OF THE DRAWINGS

The inventive method and system are explained in more detail with reference to the attached figures, wherein.

DETAILED DESCRIPTION

The method according to the invention is performed on/by the host-vehicle or a respective computing system on board of the host-vehicle being equipped with one or more sensor means.

A sensor may be any means that can acquire information suitable for describing a traffic scene at a point in time. Such sensors may be cameras, radar, lidar or the like.

Target object (target traffic participant) is an object or a vehicle being observed by generating information acquired by the data acquisition means for example at least one sensor means and for which a future behavior, a movement trajectory shall be estimated.

The present invention aims in particular at predicting trajectories of other vehicles which are about or already involved in a crash such that an evasion maneuver planning module can compute an evasion trajectory for the host vehicle that avoids or at least mitigates collision with other traffic participants and obstacles. An evasion trajectory is the spatial representation of a movement path describing a possible course of a traffic object over a given time and taking the movement parameters of the target object (for example velocity, object mass, any external influences to the target object) into account.

EP 2 562 060 A1 describes a technique performed in a host vehicle for predicting a movement behavior of a target traffic object with exemplary emphasis on target objects cutting-in to a lane of the host vehicle or cutting-out from the lane of the host vehicle. The technique is based on two separate prediction modules, wherein a context based prediction predicts a future movement behavior, i.e. a determination of what will happen, while a physical prediction is related to a determination of how a behavior may happen. The context based prediction relies at least on indirect indicators, while the physical prediction relies on direct indicators.

An indicator comprises a measurable variable conveying information about the future or ongoing behavior of a target vehicle and a confidence value indicating the state of the measurable variable.

Direct indicators comprise observable variables, which are observable only if the behavior of the target vehicle to be predicted already has started. For predicting a lane-change, a set of direct indicators may comprise one or more of a lateral velocity, a lateral position relative to the lane, a changing orientation relative to the lane, and a changing orientation relative to other traffic participants.

Indirect indicators comprise observable variables, which are already observable before the predicted behavior has started. Indirect indicators may be defined as a set of indicators excluding direct indicators. For example, indirect indicators may relate to information about a relation between at least one traffic participant and one or more other traffic participants or static scene elements, such as an indicator indicating whether or not a fitting gap is available on a lane neighboring to the host-vehicle.

Other indirect indicators may relate to information about driver intentions, which may actively be communicated by the traffic participant whose behavior is to be predicted. Examples are intentions presumably indicated with a turning-signal, a braking-light, or information received via car-to-car-communication.

A set of potential trajectories may be computed for a target vehicle. By using the predicted movement behaviors from context based prediction, the set of relevant trajectories may be reduced. Matching a traffic situation model against the history of perceived positional data in physical prediction may help to further reduce the relevant trajectories.

More specifically, for predicting a target vehicle's future position, in a first step, the probability for the target vehicle to perform one of a set of possible movement behaviors is estimated by the context based prediction. Some or all of these movement behaviors are validated by means of a physical prediction. The physical prediction validates the set of possible trajectories against a combination of the results of the context based prediction, the physical evidence, and vehicle relations. Further physical prediction estimates the future position of each vehicle. A final step may be a mismatch detection analyzing the consistency of the physical prediction and the context based prediction. In case of mismatch, a fallback to the physical prediction may be performed.

The context based prediction, physical prediction, and mismatch detection can be encapsulated in situation specific models and may be performed by different hardware units within the driver assistance system. Suited traffic situation models fitting to the vehicle's environment can be activated or deactivated based on environment perception or self-localization.

For the purpose of implementing a system for predicting movement behavior of target traffic objects by means of context based prediction, physical prediction reference is made to published patent application EP 2 562 060 A1.

Figure 1:
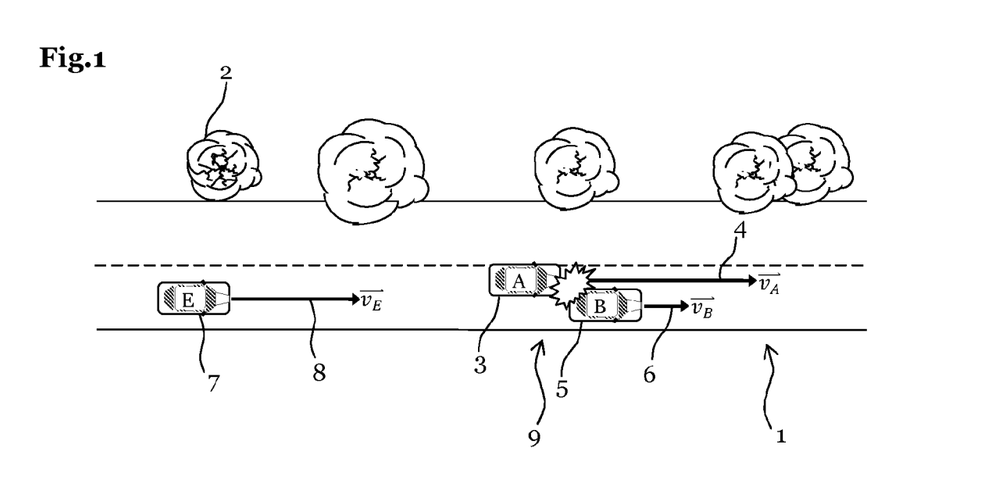
FIG. 1 depicts a traffic scene with a collision between traffic objects (participants)

In FIG. 1 an example for a traffic scene at a time t1 is shown. A straight portion of a road 1 has a single lane for each driving direction and is lined by a single line of alley trees 2. Without any restriction to the claimed invention, right-hand driving is assumed to be applicable in the depicted traffic scene. At the time t1, three vehicles, e.g. vehicle A 3 with a velocity $\vec{v}_A$ 4, vehicle B 5 with velocity $\vec{v}_B$ 6 and a host vehicle E 7 with velocity $\vec{v}_E$ 8 are traveling along the right-hand lane. The length of the respective vehicle speed vectors $\vec{v}_A$ 4, $\vec{v}_B$ 6 and $\vec{v}_E$ 8 is proportional to the respective vehicle velocity values in FIG. 1.

In the depicted scene vehicle A 3 is about to crash into vehicle B 5 at a first position 9. In this example the host vehicle E 7 succeeding vehicle A 3 at a given distance into the same driving direction will have to evade the crash at the first position 9 in order to avoid an impending collision with any of the vehicle A 3 and vehicle B 5.

Some evasion systems on board of the host vehicle E 7 might compute an evasion trajectory for the host vehicle E 7. For calculating an evasion trajectory for the host vehicle E 7, perceived trajectories of the other traffic participants may be used. In this case a collision avoidance system without taking into consideration the effects of a crash regarding the direction (and velocities) of the involved objects on board of vehicle E 7 will most likely recommend or execute by using suitable actuators of the vehicle E 7 an evasion manoeuvre to the left lane to pass the vehicles A 3 and B 5 participating in the crash, which, given their respective current velocity vectors $\vec{v}_A$ 4 and $\vec{v}_B$ 6, are deemed to stay on the right lane directly in front of vehicle E 7 in direction of its velocity vector $\vec{v}_E$ 8.

Each of the vehicles A 3, B 5 and E 7 has a center line being defined as the line in driving direction through a center point in a vertical cross section when the vehicle is traveling straight onwards. However, FIG. 1 also shows that vehicle A 3 and its center line is slightly shifted laterally in driving direction with respect to the vehicle B 5 and its center line. In case of a crash between vehicle A 3 and vehicle B 5, this offset that can be measured by sensors of the host vehicle of the center lines will result most probably in future trajectories after the crash for both vehicle A 3 and vehicle B 5 that are significantly different from the currently perceived velocity vectors $\vec{v}_A$ 4 and $\vec{v}_B$ 6. The current velocity vectors $\vec{v}_A$ 4 and $\vec{v}_{BA}$ 6 as acquired by the sensors on board of the host vehicle E 7 will be the dominating input to any calculation of future trajectories of the vehicles A 3 and B 5 as performed by a conventional ADAS on board of host vehicle E 7.

Figure 2:
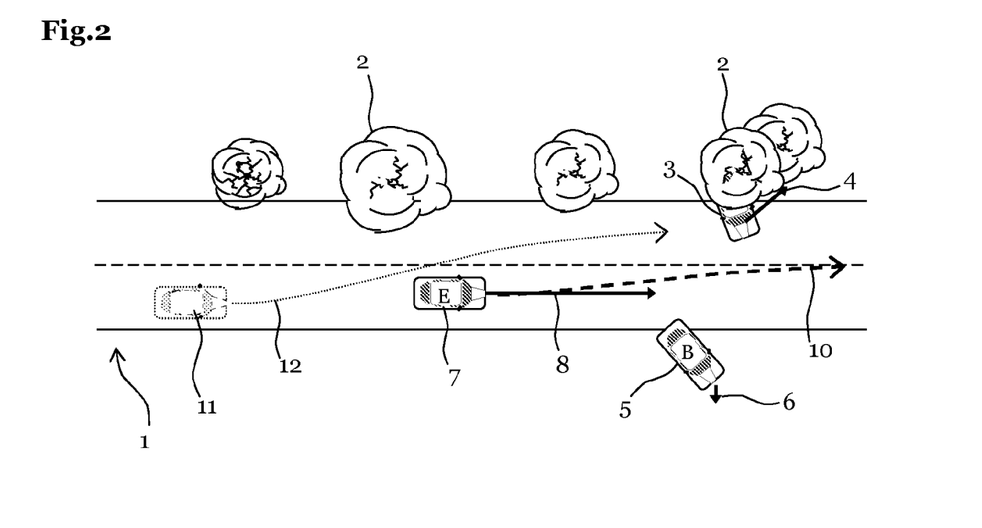
FIG. 2 depicts a traffic scene immediately after a collision between traffic objects.

In FIG. 2 an exemplary traffic scene is shown, which represents a further evolvement of the scene depicted in FIG. 1. The situation of FIG. 2 is depicted at time t2 after the crash between vehicle A 3 and vehicle B 5 occurred at time t1. As shown in FIG. 2, vehicle A 3 and vehicle B 5 did not stay on the driving lane they originally occupied in FIG. 1, but, due to the slight lateral offset of the center lines of vehicle A 3 and vehicle B 5, vehicle A 3 and vehicle B 5 moved completely different also getting new motion vectors $\vec{v}_A$ 4 and $\vec{v}_B$ 6 with respect to movement directions and velocity values in FIG. 2.

For reference a conventional trajectory most likely chosen by state-of-the-art collision evasion systems is displayed as a dashed line 12 originating from the position 11 where vehicle E 7 was at the time t1 when the crash happened at position 9. As can be seen in FIG. 2 the conventional trajectory 12 would lead to a potential crash between the host vehicle E 7 and a trajectory from the crash position 9 to a new position of vehicle A 3 in FIG. 2.

The method for assisting a driver of a vehicle according to an embodiment of the invention estimates the movement behavior of vehicle A 3 and vehicle B 5 taking the fact of a crash, the specific crash situation and the physics applicable to the crash situation into account, and performs a prediction of the after-crash-motion trajectories of vehicles A 3 and B 5 correctly. With the improved motion prediction for A and B, the optimum evasion trajectory 10 for the host vehicle E 7 is predicted, which minimizes the risk of damage to the host vehicle E 7 and injury of the passengers of the vehicles. An embodiment of the inventive system for predicting movement behavior and post-collision manoeuvre planning will be presented with respect to FIG. 3.

Figure 3:
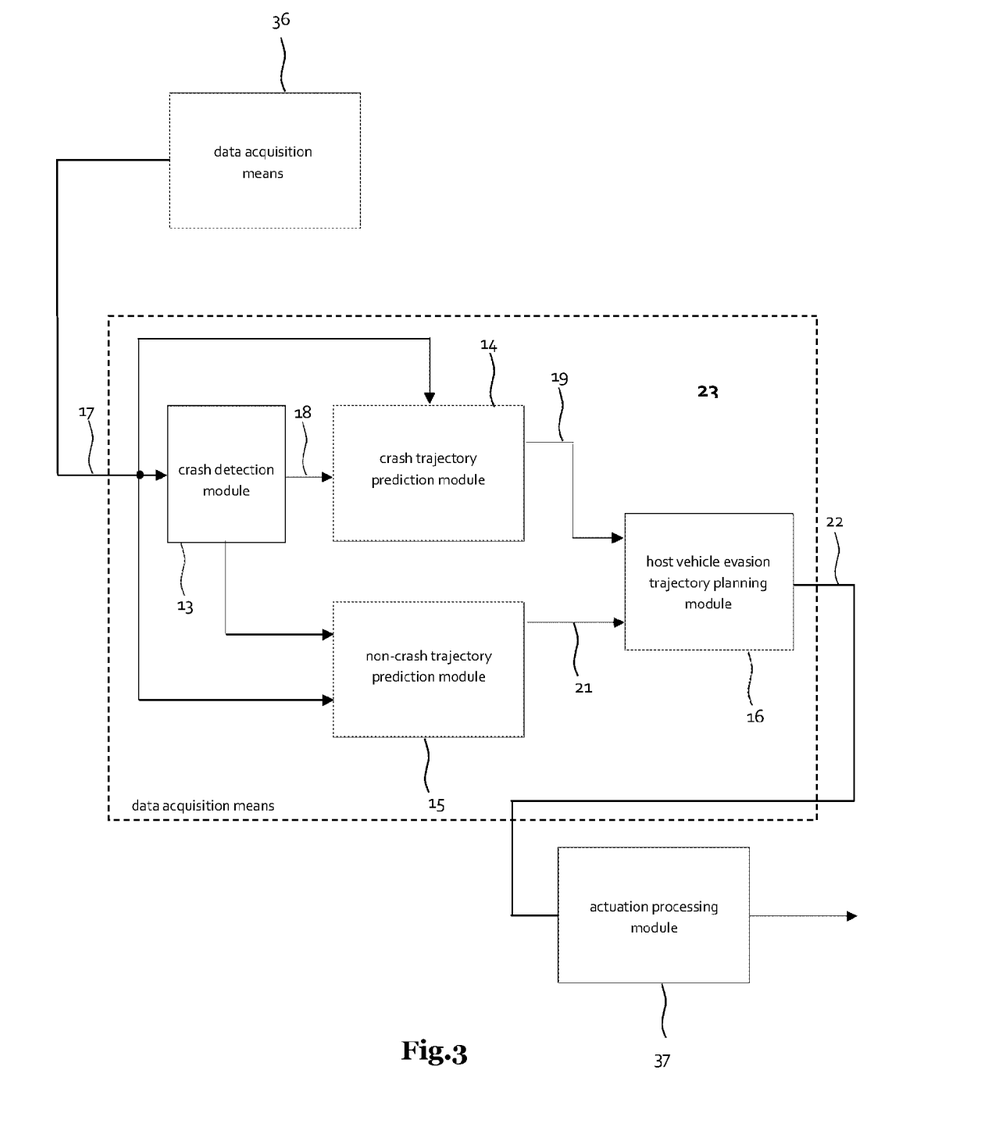
FIG. 3 depicts a collision avoidance system according to an embodiment of the invention.

A system for assisting a driver 23 according to an embodiment of this invention includes three main modules as shown in FIG. 3.

A crash detection module 13, a crash trajectory prediction module 14 and a non-crash trajectory prediction module 15 included in the system for assisting a driver 23, each receive data describing a traffic environment of the host vehicle E 7 including sensor data that conveys information about traffic objects (or traffic participants), e.g. vehicles, pedestrians, etc, the road environment, e.g. road area, lanes, etc., and static obstacles such as trees 2, guard rails, etc.

The system for assisting a driver 23 can include at least one sensor means e.g. radar sensor(s), lidar sensor(s), camera(s), environmental sensors such as a temperature sensor, rain sensor, snow sensor or any other sensor device suitable to detect the objects mentioned above or is suitable to estimate road conditions or other environmental conditions that influence driving dynamics of vehicles.

Furthermore, the at least one sensor means can comprise communication means configured to employ communication techniques like vehicle-to-vehicle or vehicle-to-infrastructure communication. The employed communication techniques allow the system for assisting a driver 23 to estimate the state of other traffic objects such as vehicles. The states of other vehicles can include current steering angle, throttle position, brake position, actual acceleration/deceleration or planned actions of ADAS systems in the other traffic object communicated via car-to-car communication for instance.

The data acquisition means 36 provides data describing a traffic environment 17 to the crash detection module 13. The crash detection module 13 analyzes the data describing a traffic environment 17 and generates crash determination information. The crash determination information is information which enables the crash detection module 13 to determine if a crash situation between any of the traffic objects in the vicinity of the host vehicle E 7 and perceived by the sensors means on board of the host vehicle E 7 is imminent.

In an embodiment, the system for assisting a driver 23 of a host vehicle may include an actuation processing module 37 configured to generate an actuation signal based on prediction information, and to control an actuator based on the actuation signal.

The system for assisting a driver 23 of a host vehicle according to an embodiment the actuation signal may control an actuator to control the vehicle E 7 in a lateral direction and/or recommends an evasion trajectory to a driver of the vehicle E 7.

The actuation processing module 37 of an embodiment may be configured to control the vehicle E 7 in a lateral direction by controlling an electrical power steering and/or by accelerating or decelerating at least one wheel of the vehicle E 7 and/or passive safety equipment in case the host vehicle E 7 is determined to be involved in the crash as described above with respect to the method according to the invention.

The crash detection module 13 determines based on the crash determination information if a crash situation exists or is about to happen and which of the traffic objects in vicinity of the host vehicle are involved in the crash situation.

In particular the crash detection module 13 determines which other vehicles are about to or are already colliding.

Vehicle identification data, data describing the vehicle characteristics and positional as well as movement characteristics of the vehicles that are involved in the detected crash situation is passed to the crash situation prediction module 14 as data describing the crash situation 18 responsible for applying crash situation models for crash behavior prediction.

Optionally data on all other traffic objects is passed to a behavior prediction module 15 configured to apply (non-crash traffic) situation models for behavior prediction.

The crash trajectory prediction module 14 and the non-crash trajectory prediction module 15 contain situation models that are valid for crash scenarios and non-crash situation models respectively.

The non-crash trajectory prediction module 15 can for example employ prediction models as described in published patent document EP 2 562 060 A1 whose contents referring to predicting movement behavior of target traffic objects are herewith incorporated by reference. Furthermore, static models (object keeps the current state), linear models (objects will change its state according to e.g. its current position and velocity) or other physical models (objects will change its state according to e.g. its current position. Velocity and acceleration) can be used to predict the movement behaviour of the target traffic object.

The crash trajectory prediction module 14 is a core of the inventive method for assisting a driver of a vehicle. The crash trajectory prediction module 14 receives data describing the traffic environment 17, data describing the crash situation 18 along with the information that a crash is imminent. The crash trajectory prediction module 14 is configured to apply specific crash situation models to the perceived crash situation and the data describing the traffic environment 17 and to predict the future movement behavior of the vehicles participating in the crash or collision, e.g. the future heading and velocities of the vehicles after the crash for a certain time interval.

In case of the traffic scenes of FIGS. 1 and 2, the vehicles A 3 and B 5 constitute the traffic objects whose dynamic data and positional data is to be provided to the crash trajectory prediction module 14. The crash trajectory prediction module 14 further receives data describing the traffic environment 17 such as about the spatial layout of the road and the road surroundings and static objects such as trees 2. The data describing the traffic environment 17 sets decisive restraints for the calculation of the future movement behavior of the vehicles A 3 and B 5, which is evident when considering the after collision situation at time t2 as depicted in FIG. 2. In the depicted scene the vehicle A 3 changes its movement presumably abrupt at one of the trees 2 and will acquire an additional rotational moment when taking the position of the tree 2 and the motion vector $\vec{v}_A$ 4 into account.

Returning to FIG. 3 the crash trajectory prediction module 14 applies crash situation models to the collision situation and based on the data describing the traffic environment 17 generates prediction information on the future movement behavior 19 of the target vehicles A 3 and B 5 involved in the collision, e.g. a future heading and velocity of the target vehicles A 3 and B 5 after the crash.

In particular for predicting the future motion of the at least one target vehicle determined as being involved in the crash situation, information about the current state of the at least one target vehicle and, optionally, also the state of the target vehicles A 3 and B 5 participating in the crash are provided to the crash situation model. The at least one crash situation model employed in the crash trajectory prediction module 14 can for example be derived from physical models and/or crash simulations and/or crash tests. Examples for physical models are perfect elastic collisions, inelastic collisions or a combination of the two aforementioned models. For the physical models the current state of the target vehicles participating in the crash can be used together with their mass to derive future states of the participating target vehicles like vehicle position and vehicle velocity. The mass of the participating target vehicles can be at least one of a preset value, be derived from a classification of the participating target objects (e.g. passenger car, sports car, bike, motorcycle, pedestrian, truck, guardrail, wall etc) determined by image processing and assigning a specific vehicle mass to each class of objects, by measured values of the at least one sensor means or by vehicle-to-infrastructure or vehicle-to-vehicle communication. For the crash-test-models the type of target vehicle (vehicle brand and type or type of crash participating target vehicle like enumerated above) can be provided to the crash situation model in addition to their current state.

The employed crash situation model can generate at least one of two different types of output information from the input data describing the traffic environment and or sensor data 17 and data describing the crash situation 18, one type of output being a discrete time sequence output and the other output type being a time continuous output. A discrete time sequence crash situation model provides the prediction information about the crash scene for a number of future points in time. The time sequence prediction information might then contain the predicted states of the target vehicles involved in the crash situation.

Another output of the crash situation model can include a spatial position for a target vehicle for a certain point in time for a number of times.

Figure 4:
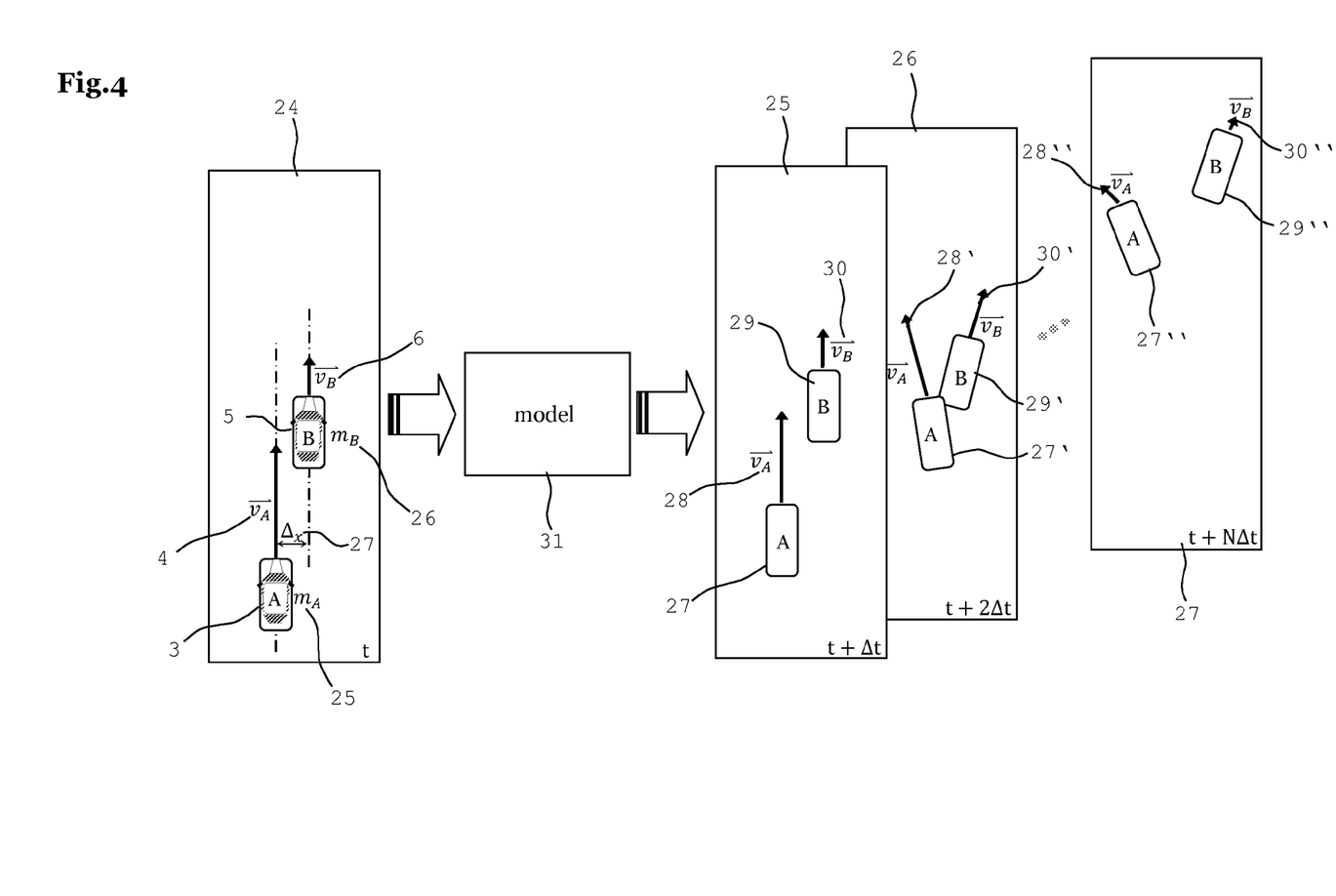
FIG. 4 depicts a crash trajectory prediction sequence according to an embodiment of the invention.

FIG. 4 shows an example in which the crash trajectory prediction module 14 applying a crash situation model on the data describing the traffic scene 17 being input generates a discrete time sequence of slices of output prediction information. Each slice of output prediction information comprises the predicted states of the target vehicle A 3 and the target vehicle B 5 respectively forming part of a collision scene over time.

In FIG. 4 the time slice 24 depicts a birds-eye-view of the traffic scene at a time t. The method for assisting a driver determines a collision situation involving the vehicle A 3 with a vehicle mass $m_A$ 25 and a vehicle velocity vector $\vec{v}_A$ 4 and the vehicle B 5 with a respective vehicle mass $m_B$ 26 and a vehicle velocity vector $\vec{v}_B$. The vehicles A 3 and B 5 are about to collide in a situation equivalent to the scene depicted in FIG. 1 at the time t1. The crash scene in FIG. 4 is as well as crash scene in FIG. 4 characterized by the centre axis of vehicle A 3 being slightly offset by a distance Δx 27 to the left of the centre axis of the vehicle B 5. The slice 24 represents a portion of the information about the traffic environment 17 as perceived by the at least one sensor of the host vehicle E 7.

The data describing the traffic environment 17 is input to the crash detection module 13, which determines a crash situation based on the input information and determines the target object involved in the crash. The data describing the determined crash situation 18 is provided to the crash trajectory prediction module 14 having an appropriate crash situation model 31 applicable in the detected crash scene. Parameters for applying the crash situation model 31 or even selecting the applicable crash situation model 31 from a plurality of selectable crash situation models may be based on variables determined by the data about the traffic environment 17, for example assumptions on the vehicle masses $m_A$ 25 and $m_B$ 26 of the vehicles A 3 and B 5 participating in the possible crash. The specific crash situation model 31 in the present situation provides a sequence of output slices of which exemplary slices 25, 26 and 27 are shown in FIG. 4. Each slice 25, 26, 27 depicts the crash situation at a time t+Δt for slice 25, t+2Δt for slice 26 up to t+NΔt with an integer number N for the slice 27. The sequence of points between slice 27 and 27 stands for any integer number of slices being computed at time intervals Δt between t+2Δ and t+NΔt. Each of the slices 25, 26, 27 shows the spatial position and orientation as well as the respective velocity vector for the respective point in time of the target vehicles A 3 and B 5 involved in the crash situation. The respective values for the position and orientation 27, 29, 27', 29', 27"

and 29" as well as velocity vectors $\vec{v}_A$, $\vec{v}_B$ 28, 28', 28", 30, 30' and 30" for each point in time t+Δt, t+Δt, t+2Δt are determined (predicted) by the relevant crash situation model, e.g. based on physical collision models validated by real crash test data and modified based on the vehicle masses $m_A$ 25 and $m_B$ 26.

Figure 5:
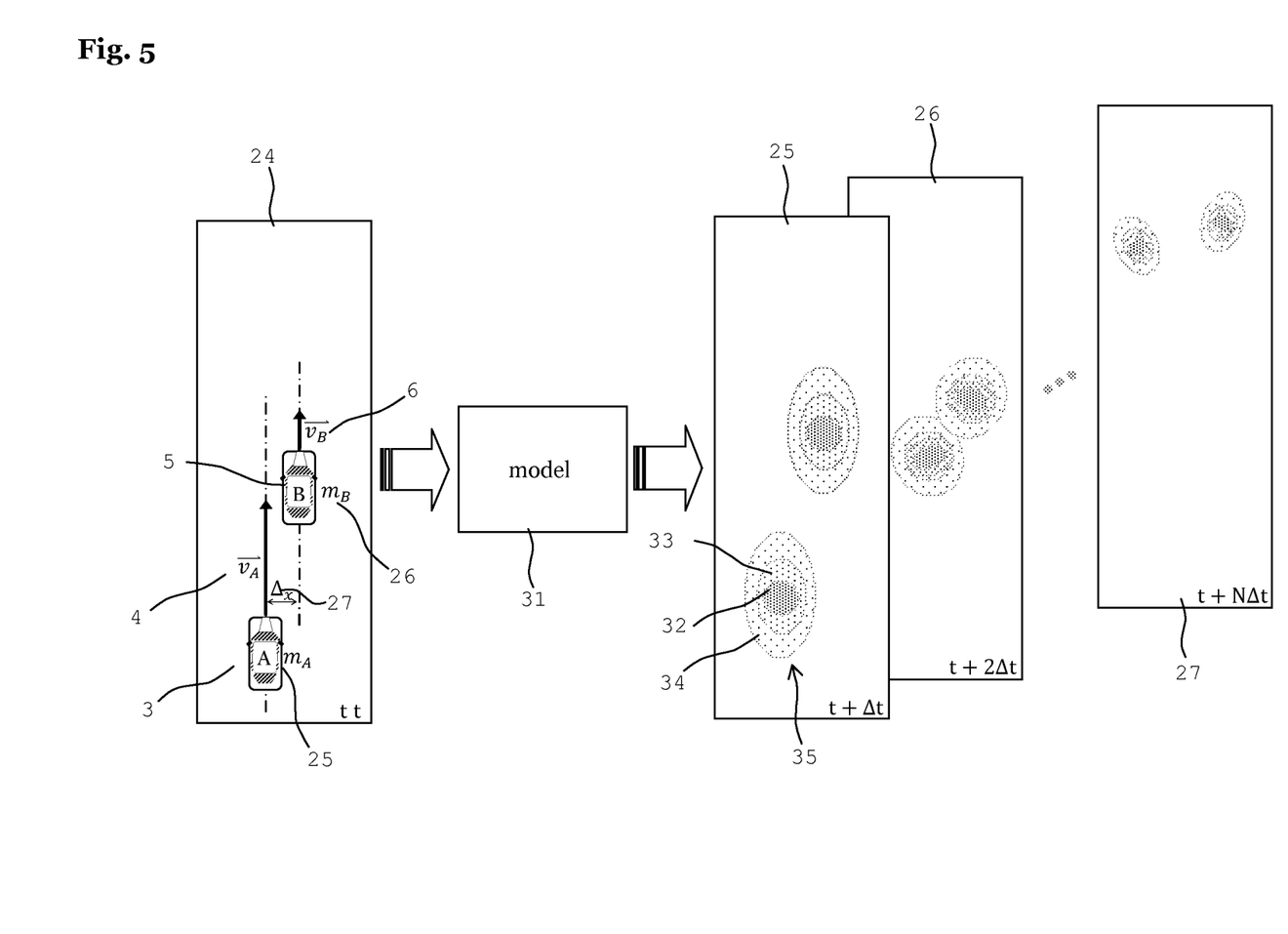
FIG. 5 depicts a crash trajectory prediction sequence according to an embodiment of the invention.

In FIG. 5 an example of a crash situation model adapted to output occupancy probabilities for the vehicles A 3 and B 5 is shown. The same reference numerals as for FIG. 4 are used and the crash situation model generally performs in the same manner as described for FIG. 4, hence reference in this respect to FIG. 4 is sufficient.

However in FIG. 5 the time slices 25, 26 and 27 provide for each vehicle A 3 and B 5 a respective probability of position for the time t+Δt for slice 25, t+2Δt for slice 26 and time t+NΔt for slice 27. In order to explain an example, in the slice 25 at a time t+Δt, the vehicle A 3 is predicted to be at a position 35 with a first probability inside the area 32, with a second probability in the area 33 and with a third probability inside the area 34 at a time t+Δt after vehicles A 3 and B 5 collided. The first probability is higher than the second probability and the second probability is in turn higher than the third probability. The graphical representation in FIG. 5 is to be considered to be a mere example, any other suitable representation of a spatial representation of probabilities can also be used for display of the prediction information. The cited respective discrete probabilities for vehicle A 3 can also be computed as continuous probabilities and output in corresponding probability maps for times t+Δt, t+Δt, t+2Δt, . . . , t+NΔt.

The slices 25, 26, 27 as discussed with respect to FIGS. 4 and 5 represent at least a part of the prediction information on the future movement behavior 19 output by the crash trajectory prediction module 14.

The prediction information on the future movement behavior 19 serves as basis for the next task performed in the host vehicle evasion trajectory planning module 16.

The host vehicle evasion trajectory planning module 16 of the system for assisting a driver 23 is adapted to plan an evasion trajectory of the host vehicle E 7. The data describing the traffic environment 17 acquired by the data acquisition means, the prediction information on the future movement behavior 19 of the target vehicles A 3 and B 5 involved in the collision as well as the further prediction information on the future behavior of further target objects 21 not involved in the collision are input to the host vehicle evasion trajectory planning module 16. The host vehicle evasion trajectory planning module 14 determines based on this input comprising the predicted trajectories of all the vehicles in the area of interest, a trajectory of the host vehicle E 7, generates and outputs the determined evasion trajectory as prediction information 22.

The determination of prediction information 21 in the host vehicle evasion trajectory planning module 16 can be performed based on known trajectory planning algorithms like rapid-exploring random trees (RRT) or dynamic programming (DynProg). For the cited trajectory planning algorithm of rapid-exploring random trees reference is made to the publication "Rapidly-exploring random trees: a new tool for path planning", Steven M. LaValle, Department of computer science, Iowa State University, Ames, Iowa 500011 USA. For the cited trajectory planning algorithm of dynamic programming reference is made to the publication "The theory of dynamic programming by Richard Bellman. International application publication documents WO 03/006288 A1 and WO 2010/000521 A1 disclose further technical procedures for determining evasion trajectories in driver assistance systems and are incorporated by reference into present application to this purpose. The host vehicle evasion trajectory planning module 16 in an embodiment can determine a predicted evasion trajectory of the host vehicle E 7 that minimizes the probability of a collision with other vehicles, e.g. vehicles A 5 and B 7 or, if a collision is unavoidable, minimizes the effect of a collision with any other vehicle in the traffic environment as perceived by the at least one sensor.

The prediction information 22 including information on the evasion trajectory of the host vehicle E 7 can provide the basis for generating a actuation signal. The actuation signal can be used to initiate suitable warnings like audible, visual and/or haptic warning signals to the driver of the host vehicle E 7, to visualize the evasion trajectory on a head-up-display and/or a monitor, and/or by actively controlling the host vehicle. The actuation signal may include information on the recommended evasion trajectory and initiate presenting a suggested action to the driver of the host vehicle E 7. The active controlling of the host vehicle can for example be performed by issuing brake commands to a vehicle brake or by using the host vehicle actuation to follow the planned trajectory by e.g. using steering (e. g. electric steering unit) or using the acceleration or deceleration of different wheels of the host vehicle to adapt the actual driving trajectory of the host vehicle E 7 to the planned evasion trajectory as conveyed in the information. The acceleration or deceleration of at least one wheel of the host vehicle E 7 can result in a respective lateral control of the host vehicle E 7 in order to follow a determined evasion trajectory for altogether avoiding or at least reducing the effects of a collision with a target vehicle involved in a collision or other target vehicles also trying to avoid a collision in response to the determined crash scenario.

Figure 6:
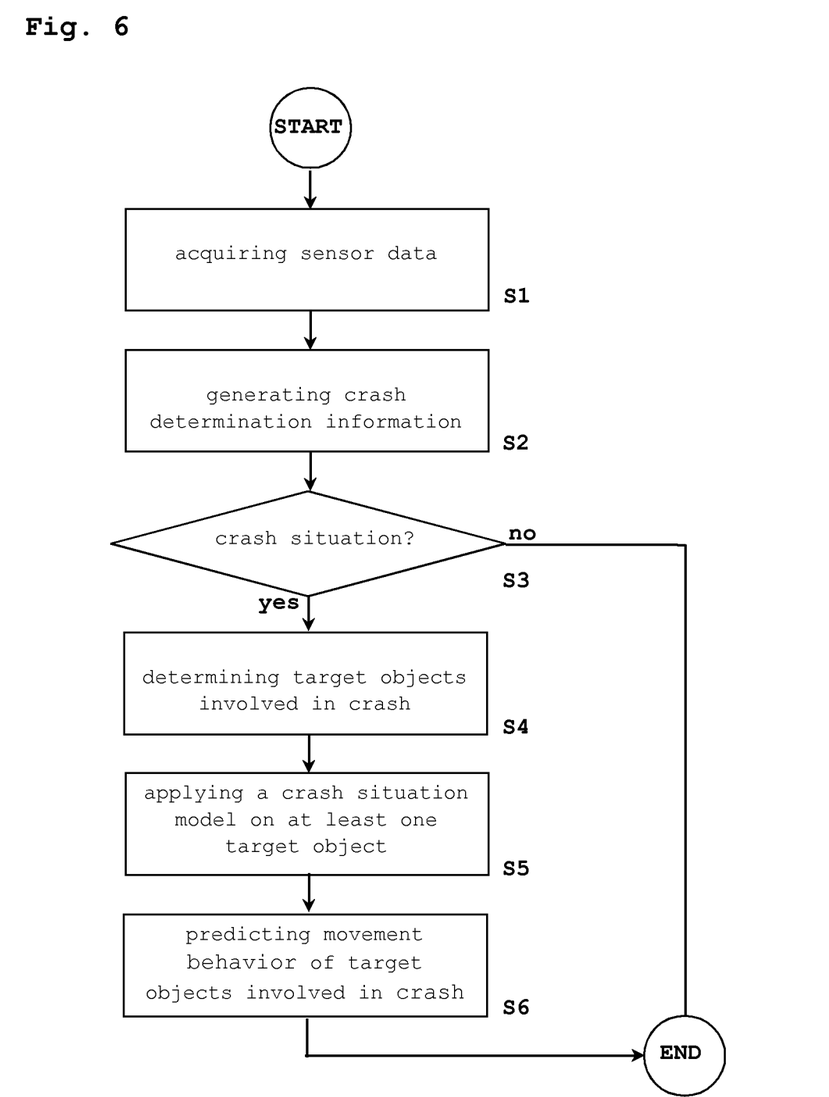
FIG. 6 depicts a flowchart for collision avoidance method according to an embodiment of the invention.

FIG. 6 presents a flowchart of a sequence of method steps executing the method of assisting a driver.

The method for assisting a driver of a host vehicle starts with acquiring data describing a traffic environment 17. The data describing the traffic environment 17 is provided to the crash detection module 13. In a step S2, the crash detection module 13 processes data the describing a traffic environment 17 in order to generate a crash determination information. The crash detection module 13 then determines based on the crash determination information whether a crash situation involving at least one target object (vehicle) exists in a subsequent step S3. If no crash situation is determined in step S3, the method for post-evasion manoeuvre planning is not required in assisting the driver of the host vehicle and the respective processing is terminated. If, on the other hand in step S3 a crash situation is determined, the method proceeds to step S4 by determining the traffic objects involved in the crash, for example the target vehicles A 3 and B 5 which are about to collide. In the step S5 succeeding to step S4, suitable crash situation models are applied to the data describing the crash environment. In step S6 prediction information describing a future behavior of the target objects, e.g. the vehicles involved in the crash, is generated and the core method for predicting movement behavior in a collision scene is terminated.

The invention claimed is:
1. A method for assisting a driver of a host vehicle, the host vehicle comprising a data acquisition means and a processing means, the method comprising steps of:
acquiring data describing a traffic environment by the data acquisition means; and processing, with the processing means, the data describing the traffic environment to generate crash determination information indicating a probability of a crash in the traffic environment;

determining, based on the crash determination information, whether a crash situation involving at least one target object will occur, wherein the at least one target object is a traffic participant;

when occurrence of the crash situation is determined, predicting movement behavior after the crash of the at least one target object based on the data describing the traffic environment by applying at least one crash situation model;

predicting further movement behavior of at least one further target object not involved in the crash situation based on the data describing the traffic environment by applying at least one traffic situation model:

generating prediction information based on the predicted movement behavior of the at least one target object and the further movement behavior of the at least one further target object:

generating an actuation signal based on the prediction information, and controlling an actuator for presenting information to a driver of the host vehicle or controlling the host vehicle based on the actuation signal.

2. The method according to claim 1, wherein
at least one possible future movement trajectory of the host vehicle is calculated, and
wherein the at least one possible future movement trajectory is calculated based on the prediction information.

3. The method according to claim 1, wherein
the at least one crash situation model comprises at least one physical collision model.

4. The method according to claim 1, wherein
the crash situation model is a model derived from crash test results.

5. The method according to claim 4, further comprising
estimating the mass of objects involved in the crash.

6. The method according to claim 1, wherein
the data acquisition means is configured to determine a state of the at least one target object or to determine a state of a road.

7. The method according to claim 1, wherein
the step of controlling an actuator controls the host vehicle in a lateral direction with respect to the host vehicle's driving direction, and/or
recommends an evasion trajectory to a driver of the host vehicle, and/or
prepares passive safety equipment in case own involvement in the crash is determined to be unavoidable.

8. The method according to claim 1, wherein
the step of controlling an actuator controls the host vehicle in the lateral direction with respect to the host vehicle's driving direction, and
the host vehicle is controlled by controlling an electrical power steering and/or by accelerating or decelerating at least one wheel of the host vehicle.

9. A system for assisting a driver of a host vehicle, the system comprising:
data acquisition means configured to acquire data describing a traffic environment; and
a processing means is configured to process the data describing the traffic environment to generate crash determination information indicating a probability of a crash in the traffic environment, wherein the processing means comprises a crash detection module configured to determine based on the crash determination information whether a crash situation involving at least one target object will occur, wherein the target object is a traffic participant;

a crash trajectory prediction module configured to predict movement behavior of the at least one target object after a crash based on the data describing the traffic environment by applying at least one crash situation model: and a non-crash trajectory prediction module configured to, when the crash situation is determined, predict further movement behavior of at least one further target object not involved in the crash situation based on the data describing the traffic environment by applying at least one traffic situation model;

wherein the processing means is configured to generate prediction information based on the predicted movement behavior of the target object and the predicted further movement behavior of the further target object, and the system further comprises an actuation processing module configured to generate an actuation signal based on the prediction information, and to control an actuator for presenting information to a driver of the host vehicle or controlling the host vehicle based on the actuation signal.

10. The system for assisting a driver of a host vehicle according to claim 9, wherein
the processing means further comprises a host vehicle evasion trajectory planning module configured to calculate based on the prediction information at least one future movement trajectory of the host vehicle.

11. The system for assisting a driver of a host vehicle according to claim 9, wherein
the crash trajectory prediction module is configured to process the data describing the traffic environment based on at least one crash situation model applying at least one physical collision model.

12. The system for assisting a driver of a host vehicle according to claim 9, wherein
the crash situation model is derived from crash test results.

13. The system for assisting a driver of a host vehicle according to claim 9, wherein
the processing means is configured to estimate the mass of objects involved in the crash.

14. The system for assisting a driver of a host vehicle according to claim 9, wherein
the data acquisition means is configured to determine a state of the at least one target object or to determine a state of a road.

15. The system for assisting a driver of a host vehicle according to claim 9, wherein
the actuation signal controls an actuator configured to control the host vehicle in a lateral direction with respect to the vehicle's driving direction, or
to recommend an evasion trajectory to a driver of the host vehicle, or
to prepare passive safety equipment of the vehicle in case involvement into the crash is determined to be unavoidable.

16. The system for assisting a driver of a host vehicle according to claim 15, wherein
the actuation processing module is configured to control the host vehicle in the lateral direction by controlling an electrical power steering or by accelerating or decelerating at least one wheel of the host vehicle.

17. A vehicle including a driver assistance system according to claim 9, wherein
the driver assistance system is configured to influence control of the host vehicle based on output signals of the driver assistance system.

18. A computer program, embodied on a non-transitory computer-readable medium, the computer program, when executed by a processor, causes the processor to:
acquire data describing a traffic environment by a data acquisition means;
process the data describing the traffic environment to generate crash determination information indicating a probability of a crash in the traffic environment;
determine, based on the crash determination information, whether a crash situation involving at least one target object will occur, wherein the at least one target object is a traffic participant;
when occurrence of the crash situation is determined, predict movement behavior after the crash of the at least one target object based on the data describing the traffic environment by applying at least one crash situation model;
predict further movement behavior of at least one further target object not involved in the crash situation based on the data describing the traffic environment by applying at least one traffic situation model;
generate prediction information based on the predicted movement behavior of the at least one target object and the further movement behavior of the at least one further target object;
generate an actuation signal based on the prediction information, and
control an actuator for presenting information to a driver of a host vehicle or controlling the host vehicle based on the actuation signal.

* * * * *